US005467533A

United States Patent [19]
Dunn

[11] Patent Number: 5,467,533
[45] Date of Patent: Nov. 21, 1995

[54] NIGHT VISION INCLINOMETER

[75] Inventor: William R. Dunn, Alpharetta, Ga.

[73] Assignee: Avionic Displays Corporation, Duluth, Ga.

[21] Appl. No.: 187,832

[22] Filed: Jan. 28, 1994

[51] Int. Cl.⁶ ..................................................... G01C 9/32
[52] U.S. Cl. ................................ 33/348; 33/365; 33/396
[58] Field of Search ............................... 33/300, 335, 344,
33/346, 347, 348, 348.2, 365, 368, 377,
378, 391, 396

[56] References Cited

U.S. PATENT DOCUMENTS

| | | | |
|---|---|---|---|
| 1,302,580 | 5/1919 | Nelson | 33/365 |
| 1,955,488 | 4/1934 | Crane et al. | 33/365 |
| 2,067,474 | 1/1937 | Carbonara | 33/365 |
| 2,384,453 | 9/1945 | Chaney et al. | 33/365 |
| 2,831,266 | 4/1958 | Dorn et al. | 33/365 |
| 3,697,940 | 10/1972 | Berka | 340/18 R |
| 3,774,314 | 11/1973 | Youngs | 22/248 |
| 3,808,697 | 5/1974 | Hall | 33/31 |
| 3,845,570 | 11/1974 | Green | 33/40 |
| 3,984,918 | 10/1976 | Chaney | 33/36 |
| 4,144,653 | 3/1979 | Gardner | 33/391 |
| 4,254,334 | 3/1981 | Baud | 250/231 R |
| 4,344,235 | 8/1982 | Flanders | 33/366 |
| 4,426,788 | 1/1984 | Hirose et al. | 33/395 |
| 4,429,470 | 2/1984 | Watanabe et al. | 33/395 |
| 4,492,029 | 1/1985 | Tanaka et al. | 33/366 |
| 4,578,871 | 4/1986 | Kathel | 33/30 |
| 4,583,296 | 4/1986 | Dell'Acqua | 33/366 |
| 4,587,741 | 5/1986 | Rorden et al. | 33/366 |
| 4,667,413 | 5/1987 | Pitts | 33/344 |
| 4,803,874 | 2/1989 | Marrast et al. | 73/155 |
| 4,854,047 | 8/1989 | Conanan | 33/37 |
| 4,912,662 | 3/1990 | Butler et al. | 364/559 |
| 4,920,412 | 4/1990 | Gerdt et al. | 358/95 |
| 4,942,668 | 7/1990 | Franklin | 33/366 |
| 5,025,567 | 7/1991 | McWilliams et al. | 33/348 |
| 5,083,383 | 1/1992 | Heger | 33/366 |
| 5,272,120 | 12/1993 | Kosuda et al. | 501/105 |

FOREIGN PATENT DOCUMENTS

| | | | |
|---|---|---|---|
| 138725 | 2/1920 | United Kingdom | 33/365 |
| 779610 | 7/1957 | United Kingdom | 33/365 |

Primary Examiner—Thomas B. Will
Attorney, Agent, or Firm—Standley & Gilcrest

[57] ABSTRACT

An inclinometer which is compatible for use with night vision equipment on aircraft and other vehicles. The inclinometer includes a white zirconia sphere movable within a damping liquid of a liquid capsule.

6 Claims, 1 Drawing Sheet

NIGHT VISION INCLINOMETER

BACKGROUND AND SUMMARY OF THE INVENTION

The present invention relates generally to inclinometers, and more particularly, to night vision compatible inclinometers for use in vehicles, such as aircraft, in which night vision goggles may be worn by the pilot.

Inclinometers are also known as slip indicators, turn-and-bank indicators, and electronic leveling indicators. Traditionally, inclinometers have been used on aircraft to indicate the attitude, or inclination to the horizontal of an axis of the aircraft at any instant in flight. Known inclinometers have included a type which is comprised of a liquid filled capsule having a ball suspended within. The pilot can ascertain the plane's attitude from the location of the ball within a viewing area or window of the capsule.

Historically, the ball within the inclinometer has been made of a ceramic material. However, ceramic material will not work with night vision equipment. Night vision green light (NVIS Secure Lighting) directed at ceramic material will cause the ceramic to scintillate. The scintillating ceramic will cause a pilot's night vision goggles to be excited which reduces the sensitivity of the goggles and impairs the pilots visibility.

Military specification MIL-L-85762A sets forth the requirements for "lighting, aircraft, interior NVIS compatible" equipment. This military specification is incorporated by reference herein.

The inclinometer of the present invention is designed to work with NVIS equipment. The present invention preferably comprises two NVIS secure lamp modules, a liquid capsule having a damping fluid therein (preferably alcohol), and a suspended ball which is preferably a spherical white zirconium oxide material (zirconia). The background of the capsule is preferably a dark or black color. The damping fluid is a fluid which preferably meets military specification MIL-C-5020, which is also incorporated by reference herein.

DETAILED DESCRIPTION OF PREFERRED EMBODIMENT(S)

Figure 1:
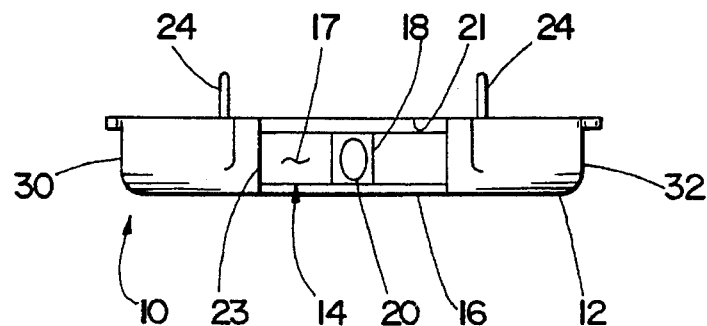
FIG. 1 is a plan view of the inclinometer of the present invention.

Referring to FIG. 1 there is shown an inclinometer 10 of the present invention. The inclinometer 10 is comprised of a body portion 12 of any suitable material, such as aluminum. Forming an integral part of the body 12 is a capsule 14 and a viewing area or window 16. The capsule 14 is preferably clear material having a graduated scale 18 thereon for providing the user with a relative basis to determine the attitude of the aircraft.

The capsule 14 preferably contains a damping liquid 17 which is preferably sufficiently colorless to preclude interference with the visibility of a ball 20 which is suspended in the damping liquid. The ball is preferably a highly polished, white zirconia sphere. The ball should exhibit no scintillation or fluorescence at wave lengths greater than 600 nm when stimulated by NVIS compatible lighting. The inside of the liquid capsule 14 should be smooth and uniform so that the ball 20 may roll freely inside the liquid. The liquid capsule 14 is preferably made of clear annealed glass tubing free from any flaws that seriously affect readability. The back and bottom, visible surfaces 21 of the liquid capsule 14 are preferably painted black.

Illumination of the liquid capsule 14 is preferably accomplished by supplying light through the ends 23, 25 of the capsule 14. The light source for the inclinometer 10 preferably should meet military specification MIL-L-85762A for chromaticity and NVIS radiance requirements. The lighting source for the inclinometer 10 may be powered and controlled from the existing aircraft lighting bus.

Figure 2:
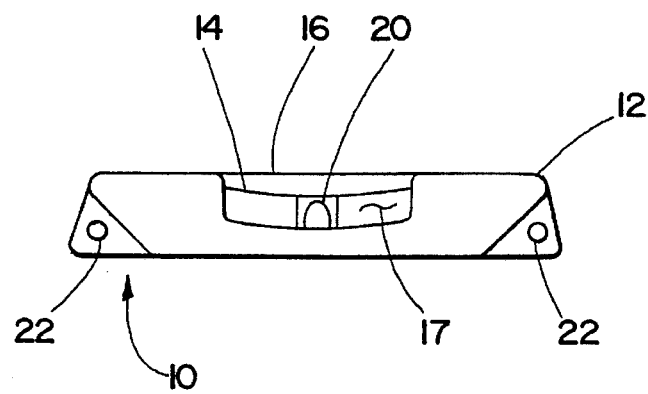
FIG. 2 is a front elevation view (visible to pilot) of the inclinometer of FIG. 1.
Figure 3:
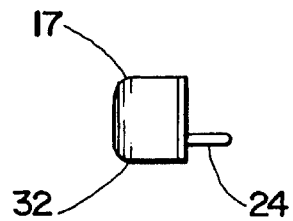
FIG. 3 is a side view of the inclinometer shown in FIG. 2.

Referring to FIG. 2, the front elevation view of the inclinometer 10 of the present invention is shown. The inclinometer 10 may be mounted to a cockpit instrument panel by threaded fasteners 22. From a side view of the inclinometer 10, as shown in FIG. 3, electrical pin connectors 24 are visible. These pins 24 may be either directly or indirectly connected to the aircraft lighting bus.

Figure 4:
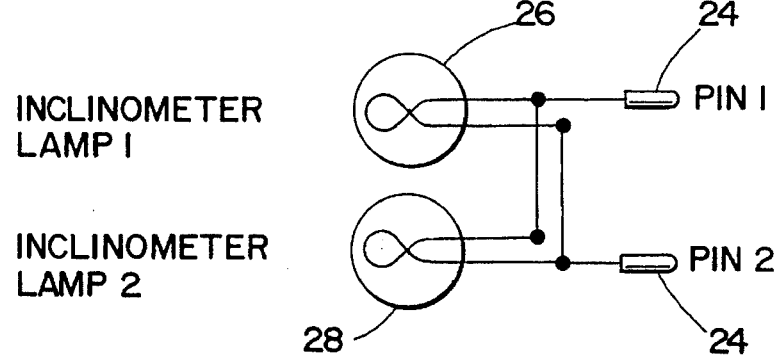
FIG. 4 is an electrical schematic diagram of the pin and lamp connections of one embodiment of the inclinometer of the present invention.

With reference to FIG. 4, a suggested electrical wiring schematic is shown for preferably two lamps 26, 28 which will preferably reside in either end 30, 32 of the body 12.

While particular embodiments of this invention have been shown and described, it is not intended to limit the same to the details of the construction set forth herein, but instead, the invention embraces such changes, modifications and equivalents of the various parts and their relationships as come within the scope of the following claims.

What is claimed is:

1. An inclinometer, comprising: a body portion; a capsule secured within said body portion, said capsule having at least a portion thereof made of clear material; a damping fluid contained within the capsule; a light source in association with the capsule; a white zirconia ball movable within the damping fluid within the capsule.

2. The inclinometer of claim 1, wherein visible walls of the body portion, as seen through the capsule, are black in color.

3. The inclinometer of claim 1, wherein the light source is powered by a lighting bus.

4. The inclinometer of claim 1, wherein the fluid is colorless.

5. An inclinometer, comprising: a sealed capsule made of glass and having a viewing area therein; a damping fluid contained within the capsule; a white zirconia sphere movable within the damping fluid and visible within the viewing area of the capsule; and, two lamps, one lamp situated at each end of the liquid capsule.

6. The inclinometer of claim 5, wherein the fluid is alcohol.

* * * * *